Patented Oct. 22, 1929

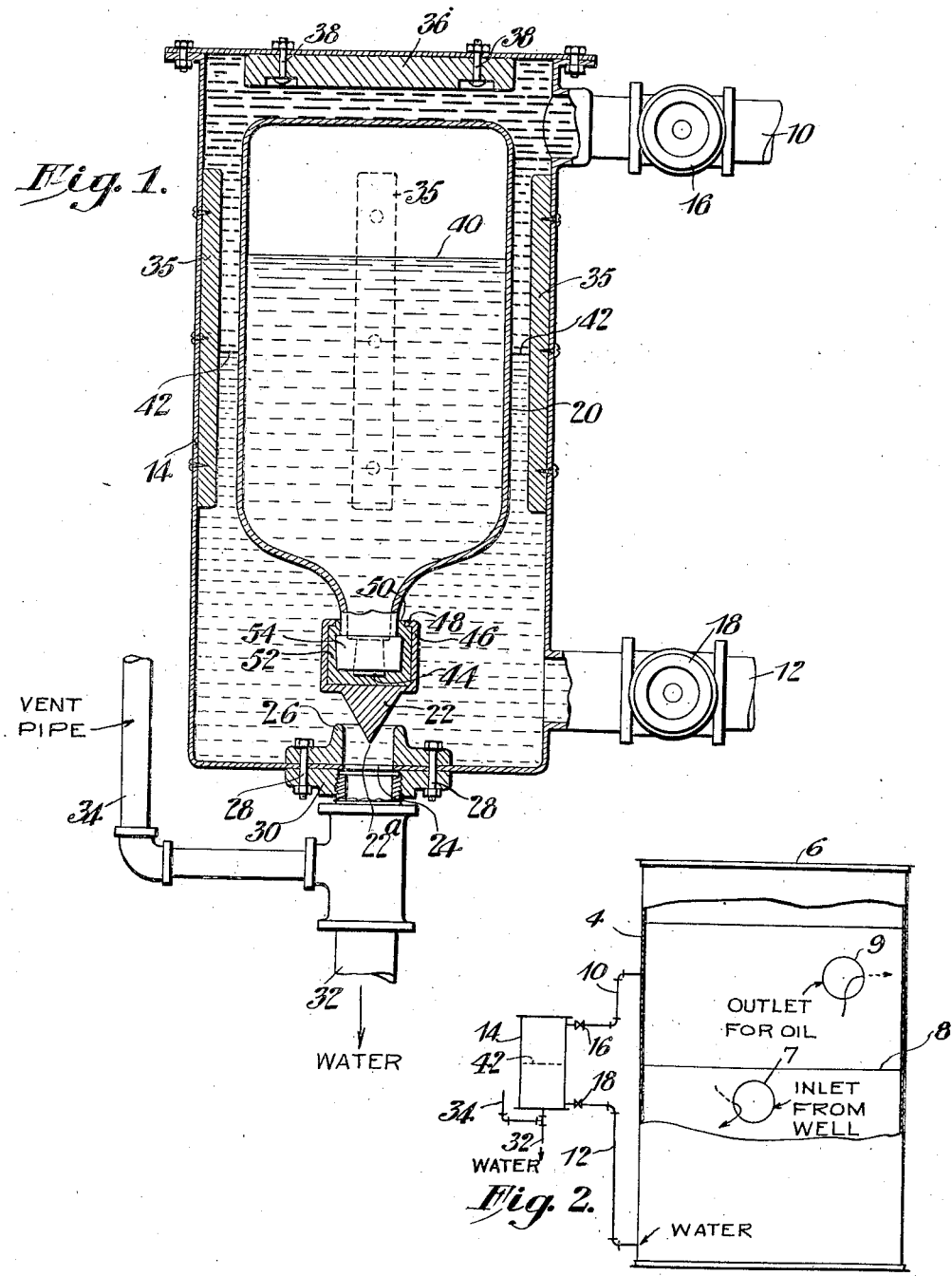

1,732,222

UNITED STATES PATENT OFFICE

ELMER FRANKLIN CANTRALL, OF BARNSDALL, OKLAHOMA, ASSIGNOR, BY MESNE ASSIGNMENTS, TO EMPIRE OIL AND REFINING COMPANY, OF DOVER, DELAWARE, A CORPORATION OF DELAWARE

METHOD OF AND APPARATUS FOR SEPARATING GROUND WATER FROM PETROLEUM

Application filed April 2, 1924. Serial No. 703,634.

The present invention relates to devices used in the separation of water from oil.

It has been known in the oil fields to conduct the oil from one or more wells directly to a "gun barrel" tank in which as much as possible of the water always contained in the oil as it flows from the ground, is separated out. Where this arrangement was first introduced, the gun barrel tank was left open to the atmosphere and the water drawn off from the bottom of the tank by a siphon pipe, the oil flowing from the upper part of the tank. The fact that the top of the tank was open resulted in serious losses of light fractions by evaporation, causing operators later to cover the gun barrel tank substantially airtight. This arrangement however, has led to serious losses of oil through the trap owing to pressures developed by changes in level in the tank, forcing oil through the water siphon pipe.

One of the objects of the present invention is to provide a method of separating petroleum oil from ground water and an arrangement of separating tank which shall be free from both objections mentioned above.

Further objects and advantages of the present invention will be apparent from the following description taken in connection with the accompanying drawing in which Fig. 1 is an elevation, partly in section, of a float chamber containing the float valve embodying the preferred form of the invention;

Fig. 2 is an elevation partly in section, of the separation tank for separating oil from water fitted with automatic water discharging means, the whole according to the present invention.

In the drawing, 4 indicates a gun barrel separation tank having a closed substantially vapor and air-tight top 6, tank 4 being for the separation of petroleum oil from ground water by gravity. Mixed oil and ground water from the well is introduced into tank 4 through an inlet 7 placed at a convenient level and an outlet for the oil is placed at 9, outlet 9 being necessarily in the oil space of tank 4. The plane of separation between the water and the oil in tank 4 under conditions as illustrated is indicated at 8. Pipe 10 is connected through the wall of tank 4 into the space ordinarily occupied by oil and pipe 12 is tapped through the wall of the tank 4 near the bottom thereof whereby pipe 12 will always connect with the space within the tank below the water line and therefore act as a water outlet for the tank 4. Pipes 10 and 12 at their ends opposite their connection with tank 4 are tapped into the float chamber 14 near the top and bottom respectively of this float chamber. Chamber 14, being subject to the same pressure variations as occur in tank 4, must also be vapor and air tight. Valves 16 and 18 are also provided in the pipes 10 and 12 respectively for cutting off float chamber 14 from tank 4 when desired. Within chamber 14 is a float 20 and fixed to the lower portion of the float is a valve 22. Immediately below the normal position of the valve 22 is an outlet 24 from chamber 14 through which water may escape from the chamber and the connected tank 4 when the water level in the tank and chamber is sufficiently high to lift the float 20 and valve 22 sufficiently to prevent the valve from stopping the egress of water through the outlet 24. Co-operating with the valve 22 in regulating the outflow of water from chamber 14 is upstanding valve-seat 26. Seat 26 surrounds the outlet 24 as plainly illustrated and is preferably fixed directly to the bottom of the chamber 14 by means of bolts 28, 28. According to the present invention, the bolts 28 also are utilized for fastening to the outside of the bottom of chamber 14 a casting 30 surrounding the outlet 24 and having a threaded aperture therein to which the waste pipe 32 may be connected for discharging water from the chamber. Preferably a vent pipe 34 is connected to the waste pipe 32 somewhat as illustrated; that is to say, the pipe 34 is taken off at a point on the discharge side of the valve 22 whereby pipe 34 is normally operative to relieve sudden pressures due to surges in the tank 4, or in the connected line pipes, but is prevented by valve 22 from wasting oil.

The float 20 is, according to the present invention, preferably guided in the chamber 14 so that the center of the valve 22 may not pass outside of the free edge of the valve seat 26. This is accomplished in the arrangement illustrated in Fig. 1 by wooden guides 35 fixed to the sides of the chamber 14, float 20 being entirely unconnected from the walls of chamber 14 and free to move up and down within guides 35 in accordance with changes in the water level. The ready and effective seating of the valve 22 also is facilitated, according to the present invention, by making valve 22 of tapered form whereby the point 22$^a$ of the valve 22 is automatically guided down within and to the centre of the seat 26 by the point 22$^a$ and taper of the valve acting on the upper edge of the seat as the float moves downwardly, even if the float has been displaced somewhat from the centre of the chamber 14. A wooden stop 36 is also connected to the top of the chamber 14 to prevent excessive vertical oscillations of valve 20 due to sudden changes in the water level in tank 4, stop piece 36 being fixed to the top of chamber 14 by means of bolts 38, 38 having countersunk heads whereby the float 20 will be protected from contact with metal parts.

Float 20 is chosen of such weight that it will automatically lift the valve 22 from seat 26 to permit the outflow of water from the separating system when the water level in tank 4 and chamber 14 has reached the desired height. As the water level in chamber 14 rises, the valve is opened wider and wider by the float until the water may flow through the outlet 24 to the full capacity of such outlet. The float and valve however, must have sufficient weight to securely close the outlet against loss of oil in case the water level should become low and for this reason the float and system are designed to completely close the outlet before the water level reaches the upper edge of the valve seat 26. It is well known, moreover, that the ground water which separates from crude petroleum is often corrosive and attacks metals such as often are utilized for making thin metal float members. However, I have found by experimentation that a large glass bottle partly filled with water and inverted in the float chamber forms a very efficient float. A bottle float of the character just mentioned is illustrated in Fig. 1, the float or bottle being filled with water to the level indicated at 40 to give the float the specific gravity required for maintaining the water level in the tank 4 as indicated at 8 and in the chamber 14 as indicated at 42. When the bottle float has been partly filled to the desired amount with water, or some other relatively heavy liquid, the mouth of the bottle is corked in the usual manner by a cork indicated at 44. The valve 22 of pyramidal or conical shape may then be attached to the mouth and neck of the bottle, the preferred arrangement for this purpose, according to the present invention, comprising a hollow cap 46 integral with the valve 42. The cap 46 has its free edge turned inwardly to provide a flange indicated at 48 there being, however, an aperture 50 leading to the interior of the hollow cap 46 and of sufficient diameter to permit the insertion of the head and neck of the bottle. The cap 46 is then filled with cement 52 securely fastening the valve to the bottle float. In this connection it has been found that the reinforced flange or boss 54 surrounding the mouth of the average bottle co-operates with the cement 52 and the inwardly projecting flange 48 to attach the cap 46 and valve 22 to the bottle very securely. To obtain this additional strength of connection, of course the cap 46 should be of sufficient size so that the boss 54 may pass into the cap beyond the flange 48 when the parts are assembled.

It will be seen that the float according to the present invention is substantially non-corrodible and that its relatively low mechanical strength is not important because it is fully protected from contact with metal by the wooden guides 35 and stop 36. Its weight may be readily adjusted by partly filling with water to the necessary extent so that the float may be employed in any desired locality, the variations in density of the ground water in different localities being readily compensated for by varying the amount of water in the bottle. The bottle float being once adjusted by partly filling to adapt it to the density of water and oil from a given well or set of wells, it needs no further attention. The density of the oil has relatively little effect in any event.

Under normal conditions of operation, water flows out of outlet 24 continuously.

It will be seen moreover, that a system according to my invention for separating ground water from oil discharges the water without danger of loss of oil with the water and at the same time prevents any loss of light vapors or gasoline.

Having thus described my invention, I claim:

1. The combination of a float having a downwardly extending hollow projection, said float containing liquid of the same character as that in which said projection lies when the float is in use and a hollow cap having a valve fixed thereon and secured directly to said projection.

2. The combination of a float having a downwardly extending projection, said projection having a collar thereon, and a cap cemented to said collar and having a downwardly projecting valve thereon.

3. The combination of a glass bottle float partly filled with water and having the mouth of the bottle projecting downwardly, said mouth having a collar or flange surrounding it, a hollow cap inclosing said collar and having an internally projecting flange providing an opening whereby the cap may be placed over said collar, cement securing said cap to said collar and a downwardly projecting valve carried by said cap.

In testimony whereof I affix my signature.

ELMER FRANKLIN CANTRALL.